United States Patent [19]

Zyren et al.

[11] Patent Number: 5,696,515

[45] Date of Patent: Dec. 9, 1997

[54] SYSTEM AND METHOD FOR DETERMINING ABSOLUTE VEHICLE HEIGHT AND GROUND SPEED

[75] Inventors: James Gerard Zyren, Merritt Island, Fla.; Robbin Edwin Roddewig, Leesburg, Va.

[73] Assignee: Ford Motor Company, Dearborn, Mich.

[21] Appl. No.: 590,700

[22] Filed: Jan. 31, 1996

[51] Int. Cl.$^6$ .................... G01S 13/50; G01S 13/60
[52] U.S. Cl. .................... 342/104; 342/109; 342/111; 342/70
[58] Field of Search .................... 342/104, 109, 342/111, 112, 123, 127, 70, 71, 72

[56] References Cited

U.S. PATENT DOCUMENTS

| | | | |
|---|---|---|---|
| 3,003,783 | 10/1961 | Brueder | 280/124 |
| 3,617,993 | 11/1971 | Massie | 340/1 R |
| 4,101,888 | 7/1978 | Heller et al. | 342/111 |
| 4,148,027 | 4/1979 | Nowogrodzki | 343/5 SA |
| 4,354,191 | 10/1982 | Matsumura et al. | 343/7.5 |
| 4,722,547 | 2/1988 | Kishi et al. | 280/707 |
| 4,740,045 | 4/1988 | Goodson et al. | 342/112 |
| 5,016,017 | 5/1991 | Kodera et al. | 342/106 |
| 5,061,932 | 10/1991 | Tribe et al. | 342/70 |
| 5,274,380 | 12/1993 | Yatsuka et al. | 342/70 |
| 5,334,983 | 8/1994 | Ikeda et al. | 342/70 |
| 5,371,718 | 12/1994 | Ikeda et al. | 367/91 |
| 5,532,697 | 7/1996 | Hidaka et al. | 342/104 |

OTHER PUBLICATIONS

Richardson, N.A., et al, "True Ground Speed Measurement Techniques", SAE Technical Article # 821058, Society of Automotive Engineers, Inc., 1982, 10 pgs.

Tsuha, W. et al, "Radar True Ground Speed Sensor for Agricultural & Off Road Equipment", SAE Technical Article #821059, Society of Automotive Engineers, Inc., 1982, 9 pgs.

*Primary Examiner*—John B. Sotomayor
*Attorney, Agent, or Firm*—Richard D. Dixon; Roger L. May

[57] ABSTRACT

A system and method for determining absolute vehicle height and ground speed. As disclosed, a millimeter wave radar system for determining selected boundary distances is implemented based upon a generation of a modulated millimeter wave signal which is envelope detected and thereafter phase detected to determine the selected boundary distance on a continuous real-time basis. To similarly determine absolute vehicle speed on a continuous real-time basis, a method is disclosed for use in cooperation with an on-board microcomputer, the height sensing system described above, and a passive speed sensor aperture which is affixed to the chassis and directed toward the ground at some angle theta. In operation, a portion of the RF signal radiated by the height sensor is backscattered toward the passive speed sensor aperture. The Doppler Shift of this signal caused by vehicle motion is determined. Information derived from the height sensor subsystem is then used to correct errors in vehicle speed computation due to vertical chassis motion and road surface aberrations.

16 Claims, 4 Drawing Sheets

SYSTEM AND METHOD FOR DETERMINING ABSOLUTE VEHICLE HEIGHT AND GROUND SPEED

TECHNICAL FIELD

The present invention relates generally to automotive vehicles. Specifically, the invention relates to a system and method for determining selected boundary distances and absolute vehicle ground speed.

BACKGROUND ART

For optimum performance, automotive Antilock Braking Systems ("ABS") as well as active and semi-active suspension systems require highly accurate feedback on a continuous basis. In the case of ABS, feedback in the form of vehicle speed is required. In conventional system designs, this feedback is obtained by sensing the rate at which one or more of the vehicle wheels is turning. As those skilled in the art will recognize, however, because of the variety of road surfaces encountered and the possibility of varying traction conditions at each wheel, such approaches have proven both cumbersome and inaccurate.

Active and semi-active suspensions similarly require feedback in the form of ground to chassis height, more commonly known as absolute vehicle height. Conventional height detection systems used to generate the required feedback have typically been either acoustic or mechanical. Each of these designs, however, suffer from the inability to provide accurate and continuous feedback. Acoustic sensors, for example, lack the ability to concentrate sound waves in a sufficiently small area to yield desired accuracy. Similarly, mechanical sensors, which are attached directly to the vehicle axle/suspension, lack the ability to detect road surface conditions or obstacles quickly enough to provide corrective information.

Against this background, both millimeter wave radar and ultrasonic systems have been developed but heretofore have not been successfully implemented. See, for example, U.S. Pat. Nos. 4,354,191 and 4,722,547 which disclose the use of ultrasonic transducers to provide feedback in the form of vehicle speed and vehicle height. As those skilled in the art will recognize, the degree to which energy can be directed is crucial to the successful implementation of any automotive vehicle radar. Ultrasonic beams, however, lack the ability to be sufficiently focused and thus provide poor resolution. Ultrasonic beams are similarly affected by wind velocity and air temperature and, therefore, are inherently distorted by changing weather conditions. For further background regarding conventional system approaches, see also U.S. Pat. Nos. 4,148,027, 4,354,191, 5,016,017, 5,061,932 and 3,030,783, each of which suffer from one or more of the design drawbacks referenced above.

DISCLOSURE OF THE INVENTION

It is an object of the present invention to overcome the limitations of the prior art by providing a system and method for accurately determining selected boundary distances and absolute vehicle speed on a continuous real-time basis.

In accordance with the invention, there is provided a millimeter wave radar system for determining selected boundary distances based upon the generation of a modulated millimeter wave signal which is envelope detected and thereafter phase detected to determine the selected boundary distance. The present invention thus provides for primary oscillation means for generating a millimeter wave signal having a first selected carrier frequency. There is further provided secondary oscillation means for generating a second signal having a second selected frequency which is substantially lower than the carrier frequency of the first millimeter wave signal. A mixer or other amplitude modulation means is provided in electrical communication with both the primary and secondary oscillation means for mixing the first and second signals and generating a modulated RF signal. This modulated signal may then be radiated from a first directive aperture in the direction of a first selected boundary, i.e. the road surface directly beneath the radar system.

In the case of an automotive vehicle, for example, the directive aperture may be affixed substantially vertical to the vehicle chassis such that the modulated RF signal may be radiated substantially perpendicular to the road surface. A second directive aperture is also provided and affixed to the vehicle chassis and directed substantially vertically toward the area illuminated by the first directive aperture for receiving the millimeter wave signal as reflected from the first selected boundary. Again, in the case of an automotive vehicle, the second directive aperture may be affixed to the vehicle chassis, preferably adjacent to the first directive aperture in a line perpendicular to the normal direction of vehicle travel for receiving the reflected RF signal.

Demodulation means is also provided in electrical communication with the second aperture for demodulating the reflected RF signal to the frequency of the second signal. Finally, phase detection means is provided in electrical communication with demodulation means and the secondary oscillation means for determining the phase offset between the second signal and the demodulated RF signal. Once the phase offset is determined, an electrical output signal corresponding thereto may be generated and the selected boundary distance may be determined on a continuous real-time basis by reference to the determined phase offset.

It is also an object of the present invention to provide a system and method for determining absolute vehicle speed on a continuous real-time basis for use in a moving vehicle in cooperation with an onboard microcomputer. In accordance with the invention, the method includes the steps of providing an active aperture affixed to the vehicle chassis and oriented substantially vertical to the ground. Similarly, a passive aperture is provided which is affixed to the vehicle chassis and oriented at a selected angle theta($\theta$) relative to the vehicle chassis. In operation, an RF signal having a selected frequency $F_o$ is radiated from the active aperture toward the ground. A portion of this signal is scattered back to the passive speed sensor aperture. The angle of incidence, phi ($\phi$), of the backscattered radiation upon the passive speed sensor aperture is dependent upon vehicle height. Thereafter, the Doppler Shift of the RF signal as reflected to the passive aperture is determined in accordance with the formula:

$$F^1 = F_0 \left[ 1 + \frac{2(\text{Vehicle Velocity})\text{COS}\phi}{\text{Speed of Light}} \right]$$

As those skilled in the art will recognize, the Doppler Shift is caused by vehicle motion in both the forward and vertical directions. Following determination of this Doppler Shift, a first electrical signal is generated corresponding thereto on a continuous real-time basis for receipt by the microcomputer. At the same time, vertical vehicle velocity can be independently measured by the rate of change in vehicle height. The Doppler Shift of the RF signal reflected back to the speed sensor aperture by vertical motion between the vehicle chassis and the ground is determined in accordance with the formula:

$$2F_{chassis} = F_0 \left[ 1 + \frac{2(\text{Velocity of Vertical Chassis Motion})\sin\phi}{C(\text{Where } C = \text{Speed of Light})} \right]$$

Once determined, a correction signal corresponding to the error introduced by this Doppler Shift is generated on a continuous real-time basis for receipt by the microcomputer. In an alternative embodiment, a different method is employed for determination of the error introduced by Doppler Shift of the RF signal as caused by road surface changes. Once determined, a correction signal is also generated on a continuous real-time basis also for receipt by the microcomputer.

The objects, features-and advantages of the present invention are readily apparent from the following detailed description of the best modes for carrying out the invention when taken in connection with the accompanying drawings.

BEST MODES FOR CARRYING OUT THE INVENTION

Figure 1:
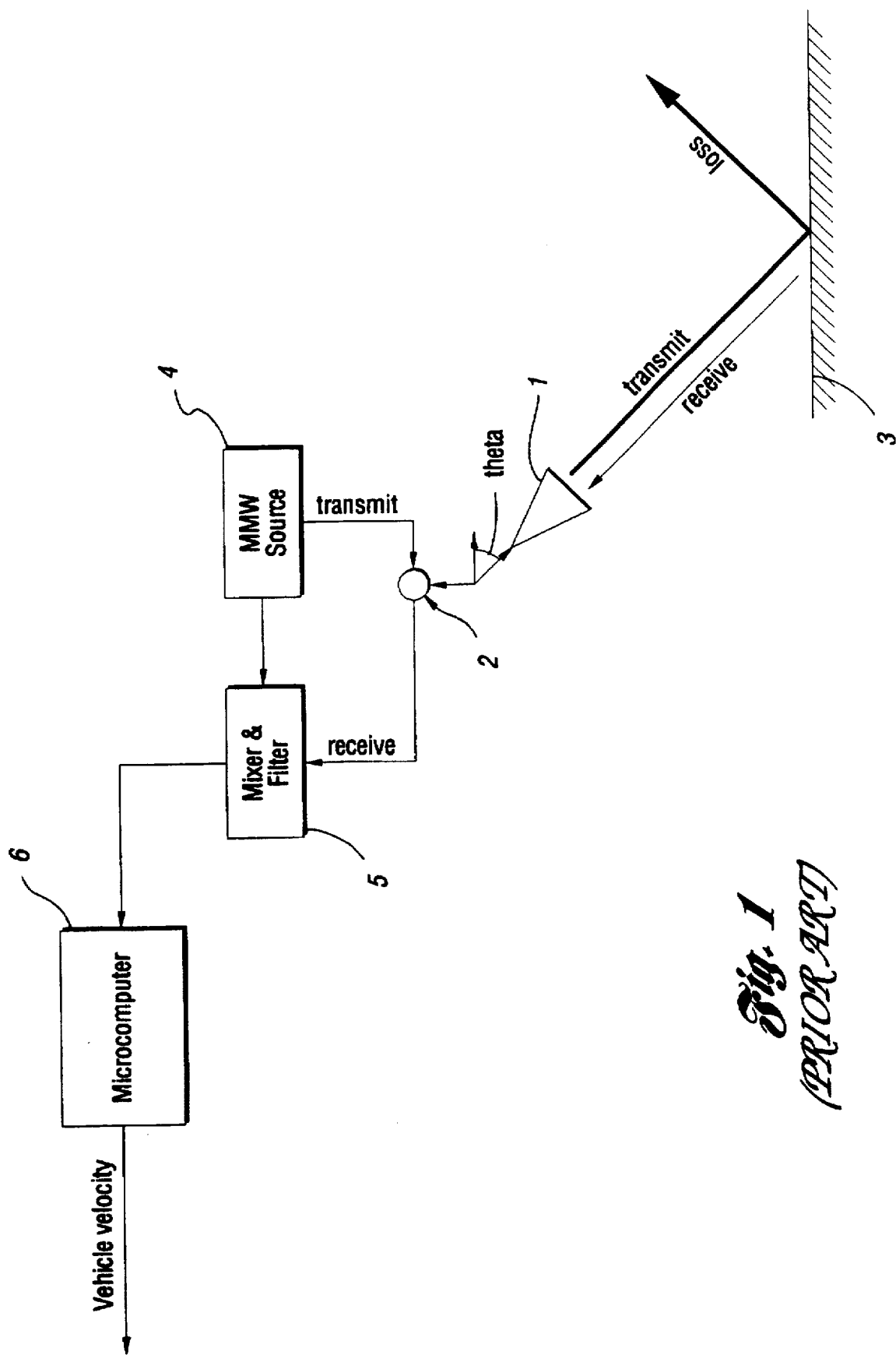
FIG. 1 is a system block diagram of a conventional ground speed radar arrangement.

A conventional ground speed radar arrangement is shown in FIG. 1. As seen, in this arrangement, a transmit/receive antenna 1 is oriented at a fixed angle θ relative to a circulator 2 for transmitting and receiving signals from a ground surface. This conventional system further includes a millimeter wave source 4 which is provided in electrical communication with a mixer and filter 5. The mixer and filter are, in turn, provided in electrical communication with a microcomputer 6.

Figure 2:
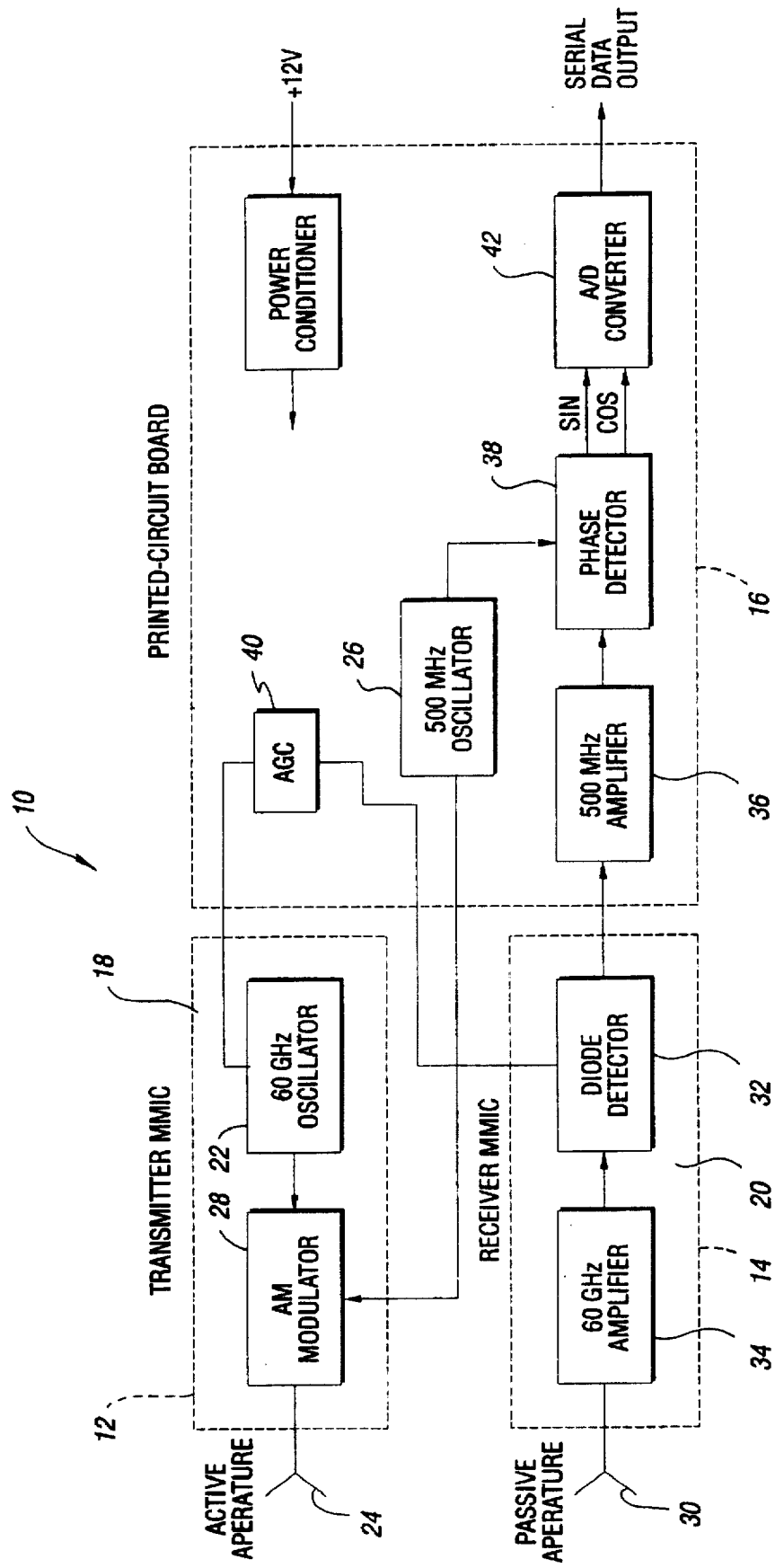
FIG. 2 is a generalized detailed block diagram of the millimeter wave boundary distance sensing system of the present invention.

With reference now to FIG. 2 of the drawings, there is provided a detailed block diagram of the components of the millimeter wave radar system of the present invention adapted for use in determining selected boundary distances. The block diagram of FIG. 1 is designated generally by reference numeral 10 and will now be described with particular reference to automotive applications and, in particular, for use in determining road surface to chassis distance (absolute vehicle height) on a continuous real-time basis. As shown in FIG. 2, block diagram 10 may be divided into three subsections; a transmitter 12, a receiver 14, and a printed circuit board 16. As shown in the preferred embodiment, both transmitter 12 and receiver 14 are disposed in corresponding Gallium Arsenide (GaAs) Monolithic Millimeter Wave Integrated Circuits (MMIC) 18 and 20, respectively. Transmitter and receiver 12 and 14 are thus completely solid state.

As referenced above, radars have been evaluated yet not successfully implemented in prior art detection systems. In addition to the drawbacks discussed above, previous systems have also utilized traditional range determination techniques, i.e., pulsed radar detection which, in radar applications, requires tremendous bandwidth and high peak radiated power to obtain adequate resolution. In applications where the range of desired distance detection is bounded, however, the much simpler approach of the present invention may be successfully employed. As disclosed more thoroughly below, by modulating the radar source at some lower frequency, height detection may be accomplished via phase detection at the lower frequency.

Still referring to FIG. 2, the boundary distance detection system of the present invention includes primary oscillation means 22 for generating a first millimeter wave signal having a first selected carrier frequency. This carrier frequency is chosen to be high enough such that a narrow beam may be radiated from active aperture 24. Aperture 24 is highly directive, i.e., on the order of 25 dB to ensure that all radiated energy is concentrated in the direction of radiation so as to reduce vehicle-to-vehicle interference. As discussed more thoroughly below, Automatic Gain Control (AGC) is also employed to ensure that the minimum level of RF energy is used at all times. Those skilled in the art will recognize that such monitoring is required because the reflective properties of boundary surfaces and, in particular, road surfaces, will change with environmental conditions.

In the preferred embodiment, a carrier frequency of approximately 60 GHz is selected for the primary oscillation means 22. There is further provided secondary oscillation means 26 for generating a second signal having a second selected frequency. For reasons also discussed more thoroughly below, this frequency of modulation is selected to be substantially lower than the carrier frequency of the primary oscillation means. In the preferred embodiment, the frequency of modulation is thus selected to be approximately 500 MHz. As seen, both the primary and secondary oscillation means are provided in electrical communication with amplitude modulation means 28 which provides the medium for mixing the first and second signals to generate a modulated RF signal. This modulated RF signal may thus be radiated by active aperture 24 toward the road surface.

As seen, the distance sensing system of the present invention further includes a passive aperture 30 which is provided in electrical communication with demodulation means 32 for demodulating the RF signal as reflected from the road surface to the second selected frequency, i.e., frequency of modulation. As shown in FIG. 2, in the preferred embodiment, the demodulation means comprises a biased diode square-law detector which is provided in electrical communication with both a 60 GHz amplifier 34 and a 500 MHz amplifier 36. The system further includes phase detector means 38 which is provided in electrical communication with demodulation means 32 and secondary oscillation means 26 for determining the phase offset between the second signal and the demodulated RF signal so as to generate an electrical output signal on a continuous real-time basis corresponding to the determined boundary distance. In the preferred embodiment, secondary oscillation means 26 outputs a sinusoidal signal.

In keeping with the invention, it is understood that for accurate boundary distance measurement, not only must the area illuminated by the RF beam be smaller than the obstructions sought to be detected, i.e., pot holes, but the beam diameter must also be large enough so that small obstructions, such as cracks in the pavement, will not be misinterpreted as being large obstacles. Similarly, the modulation frequency, i.e., the frequency of the second signal, must be sufficiently high to enable accurate distance measurement. At the same time, the frequency must be low enough to preclude range errors which may result from phase ambiguity.

To more fully understand the system and method disclosed herein by applicants, consider the following example of an automotive vehicle having an 8 inch road surface to chassis distance at full suspension compression, 20 inch chassis to road surface distance at full suspension extension and an average vehicle height of 14 inches. As readily seen, the range of suspension travel is therefore 12 inches. To determine the modulation frequency $F_m$, i.e., the carrier frequency of the second millimeter wave signal, it is understood that the two-way propagation path is 24 inches. Thus, to eliminate the possibility of range ambiguity due to phase wrap at the extremes of suspension travel, the frequency of modulation is selected such that the total range capability is between 7 and 21 inches. In other words, a one-inch buffer is provided on either side of the vehicle height envelope such that the range of suspension travel is increased to 14 inches and the two-way propagation path is similarly increased to 28 inches. Once it is known that the wave length is 28 inches, i.e., 71.12 cm, the frequency of modulation can be readily obtained in accordance with the formula:

$$F_m = \frac{C}{\lambda_m} = \frac{3 \times 10^{10} \, Cm \, s^{-1}}{71.12 \, Cm} = 421.8 \, MHz$$

If it is arbitrarily assumed that the 421.8 MHz modulator is on the same MMIC as the primary oscillation means, and the MMIC is mounted at the base of the active aperture 24, the electrical path from the modulator to aperture 24 is taken to be zero. It can similarly be assumed that the diode detector 32 is mounted at the base of the passive or receiving aperture and the phase detection means 38 is on the same MMIC. Thus, the electrical path from the passive aperture 30 to the phase detection means 38 is also assumed to be zero. Again, these assumptions are arbitrary. If the actual path lengths are not zero, the validity of the disclosed technique will not be affected. Finally, it is assumed that the reference signal generated by the secondary oscillation means 26 is fed to phase detection means 38 via a 3 cm piece of coaxial cable. To determine the phase delay caused by the coaxial cable, it is thus necessary to determine the velocity of propagation in the coaxial cable as well as its electrical length. As those skilled in the art will recognize, the velocity of propagation is ⅔C or $2 \times 10^8 \, Ms^{-1}$. The electrical length of this coaxial cable can thus be expressed:

$$t = \frac{3 \, Cm}{2 \times 10^{10} \, Cm \, s^{-1}} = 0.15 \, n \, sec$$

It is therefore seen that transit time from the secondary oscillation means to the phase detection means is 0.15 n sec. To determine the phase offset due to the length of the coaxial cable, the transit time must thereafter be divided by the period of the wave, i.e., $1/F_m$. Thus, the phase offset due to the length of the coaxial cable may further be expressed as:

$$(1/421.8 \times 10^8)(0.15 \, n \, sec) = 0.06327 \lambda = 22.777°.$$

Because the phase delay at the phase detection means is equivalent to the phase delay due to the length of the coaxial ($F_r$) cable minus the phase delay at the passive aperture ($F_h$), attention must now be directed to determining the latter quantity.

As those skilled in the art will recognize, the two-way path from the active aperture 24 to the ground surface at nominal vehicle height is 28 inches. To determine the number of modulated wave lengths, the distance of the two-way path must be divided by the wave length of the modulated signal (28 inches) which yields 1.00=360°.Thus, the received phase at the passive aperture is 360°. Because phase wraps every 360°, the phase at the passive aperture $F_h$ is thus 0°. Against this background, it can be readily seen that the phase offset ($F_r$–$F_h$) at a nominal vehicle height of 14" is thus 22.77°–0°=22.77°. Because it is assumed that a 1 millivolt output is provided from the phase detection means per degree of offset, an output signal of 22.77 millivolts is outputted from phase detection means 38 at a measured nominal vehicle height of 14 inches. As readily seen, by similar computation, the phase offset may be determined and readily charted for the range of chassis-road surface distance. By reference to this known information, absolute vehicle height, may be determined on a continuous real-time basis.

Still referring to FIG. 2, in the preferred embodiment, Automatic Gain Control means 40 is also provided in electrical communication with primary oscillation means 22 and demodulation means 32 to ensure the minimum amount of RF power is radiated at all times and thus reduce, if not eliminate, vehicle-to-vehicle interference. It is further seen that the analog output of phase detection means 38 includes both sine and cosine voltage outputs. In an alternative embodiment, where digital information may be required for use in cooperation with a microcomputer, an analog-to-digital converter 42 is provided in electrical communication with phase detection means 38. In operation, the microcomputer, not shown, may be used to determine the arc tangent of the ratio of the sine and cosine phase detector outputs. Similarly, the microcomputer may be adapted to determine the sum of the squares of the sine and cosine phase detector outputs to provide a measure of signal power as well as other system diagnostics. Still further, in yet another alternative embodiment, a phase lock loop may be utilized to generate an error voltage proportional to the detected phase offset. Those skilled in the art will readily recognize the trade off between speed and accuracy, however, when adopting phase lock loops.

Figure 3:
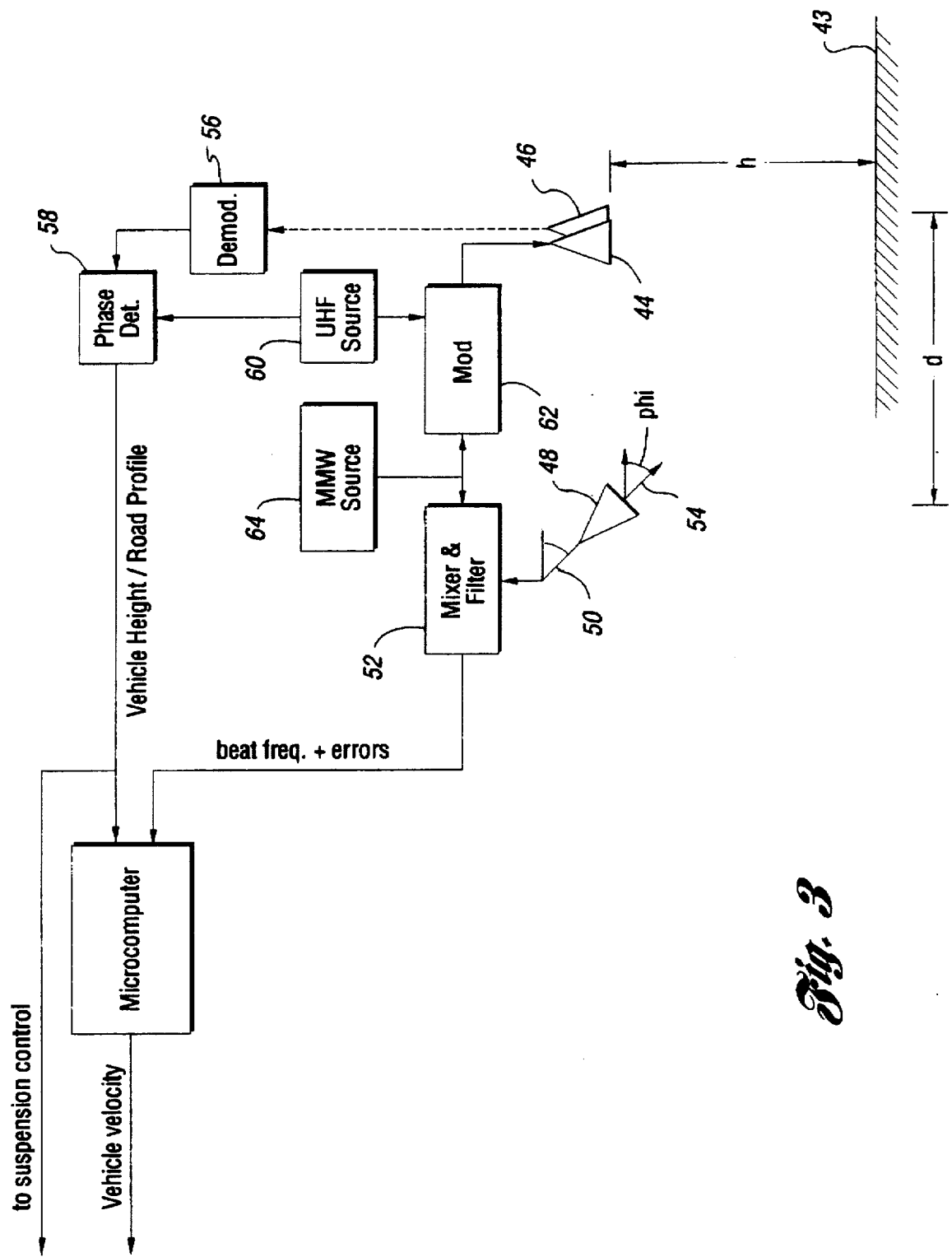
FIG. 3 is a system block diagram of the speed sensor architecture of the present invention.

With reference now to FIG. 3 of the drawings, the system and method for determining absolute vehicle speed of the present invention will now be described in detail. As those skilled in the art will recognize, to date, several practical ground speed radars have been built. Most conventional systems are simple Continuous Wave (CW) radars which detect frequency shifts in the return signal, scattered from a stationary point, typically the road surface directly beneath the vehicle, due to the motion of the vehicle. Consider, for example, the situation wherein a vehicle is traveling in the direction of a known obstacle and radiates energy at a given frequency, $F_o$. Due to the motion of the vehicle, the reflective signal received at that vehicle will be at a higher frequency, F'. This change, or shift in frequency due to the relative motion of a radiating source is known as the Doppler Shift. Again, as those skilled in the art will recognize, the amount of the frequency shift is proportional to vehicle velocity in the direction of propagation and $F_o$.

Conventional ground speed radars direct a beam toward the ground beneath the vehicle at some fixed angle. This arrangement renders a high return loss due to the fact that most of the radiation incident on the road surface is scattered away from the receive aperture. This results in a less efficient system which requires higher radiated power to compensate for the loss. Similarly, such radars are known to interfere with similar radars on other vehicles. For this reason, the radar system of the present invention utilizes an active aperture 44 which is affixed to the chassis of a vehicle 41 and oriented substantially perpendicular to the road surface 43. As seen in FIG. 3, road surface 43 is stationery and radar energy may be reflected therefrom toward the receive antenna for speed sensor 48. This reflected energy will be Doppler Shifted with one modification. Because vehicle direction is not in the same direction as wave propagation, vehicle motion must be considered as the sum of two vectors, one of which is parallel to the axis of propagation. This component can be calculated:

Effective vehicle velocity =vehicle motion (COS (φ)), where φ=angle at which scattered energy is incident upon the receive antenna.

Angle φ is a function of vehicle height. Referring to FIG. 3, φ may be determined as shown:

φ=arctan (h/d).

The equation for Doppler Shift may thus be expressed as:

$$F^1 = F_0 \left[ 1 + \frac{2(\text{Vehicle Velocity})\text{COS}\phi}{C(\text{Where } C = \text{Speed of Light})} \right]$$

The above calculation of Doppler Shift caused by vehicle motion solves but one of the problems faced by applicants. Just as forward vehicle velocity may be resolved into its vector components to calculate the amount of Doppler Shift, chassis motion as well as road surface changes can cause Doppler Shift as well. If not compensated for, the latter may cause substantial error in the determined vehicle speed. Against this background, applicants have found that radiating antenna 44 radiates energy which is scattered back to the passive speed sensor aperture 48. This energy is Doppler Shifted by both vehicle motion in the forward direction and by relative vertical motion between the road surface and chassis. Due to its vertical orientation, however, energy reflected back to the active aperture is shifted only by relative vertical motion of the chassis and road surface. This signal can thus be used to correct the signal received by the passive aperture to determine true forward vehicle velocity. The equation for Doppler Shift due to chassis motion, for example, may be expressed as:

$$F_{chassis} = F_0 \left[ 1 + \frac{2(\text{Velocity of Vertical Chassis Motion})\sin(\phi)}{C(\text{Where } C = \text{Speed of Light})} \right]$$

Unless this effect is compensated for, it will introduce errors into the vehicle speed calculation. From the equation above, it is readily apparent that vertical velocity must be known. This information can be derived from the rate of change of vehicle height, which is measured on a continuous basis. In an alternative embodiment, additional circuitry is included to measure doppler shift of the carrier frequency at the height sensor aperture and thereby determine vertical velocity on a continuous real-time basis. By the same logic, it may be shown that road surface undulations and pot holes may have a similar effect. In addition to the foregoing, applicants have found yet another source of error inherent in prior art ground speed sensing systems. As those skilled in the art will recognize, the radiated beam will have an angular spread associated with it. For example, assuming a 10° half power beam width, the values for $\theta_{min}$, $\theta$ and $\theta_{max}$ are 40°, 45° and 50°, respectively. Using these values to compute Doppler returns at 60 miles per hour, yields $F_{Doppler\ Max}$ =12.2 KHz, $F_{Doppler}$ =11.83 KHz and $F_{Doppler\ Min}$ =10.75 KHz. Because of this effect, and the distribution of radiated antenna energy in the beam, the result is a distribution of Doppler Shifted frequencies rather than a single frequency.

In the present invention, a ground "spot" is illuminated by energy radiated from active aperture 44 which is affixed to the vehicle chassis and oriented in a vertical direction toward road surface 43. This spot is essentially "rotated" by an angle from the perspective of passive speed sensing aperture 48. As a result, the illuminated spot is effectively narrowed. Thus, assuming θ=45°, the Doppler frequency distribution may be recalculated as:

$$\Delta F = |F_o - F_{max}| = |F_o - F_{min}| \approx 1 \text{ KHz}$$

For the bistatic radar of the present invention:

$$\Delta F^1 = \Delta F \cos \theta = 0.71 \text{ KHz}$$

As seen, approximately a 29% reduction in the Doppler frequency distribution is achieved. In previous systems, the above-referenced errors caused by chassis motion, road surface changes and angular beam spread were resolved through long integration techniques which correspondingly yielded slow ground speed updates. As a result, the prior art ground speed sensors proved ineffective where continuous true ground speed data was essential, such as in ABS applications. As readily seen, the ground speed sensing system of the present invention overcomes the inabilities of the prior art and provides highly accurate ground speed information on a continuous real-time basis appropriate for ABS applications.

Figure 4:
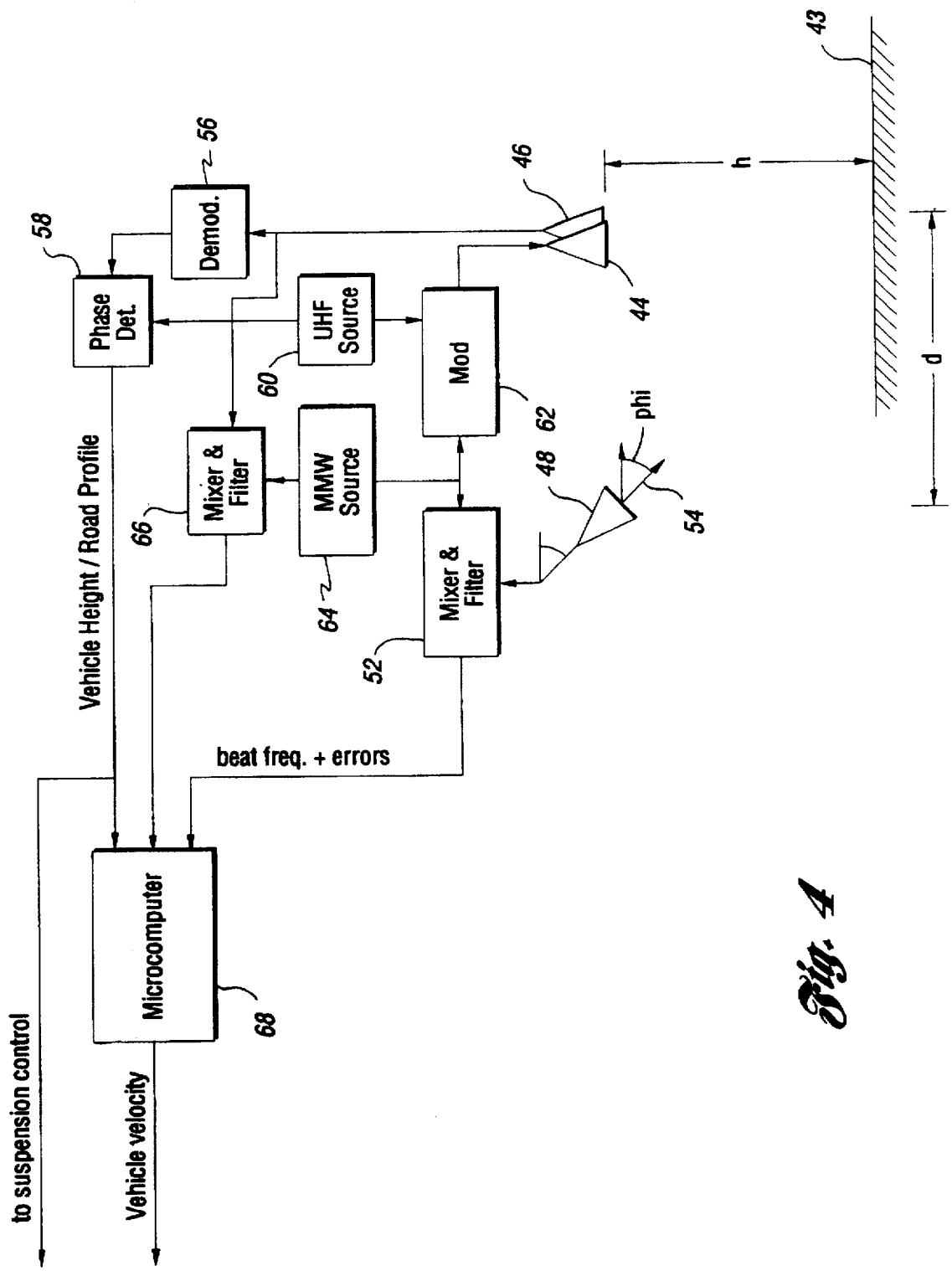
FIG. 4 is a system block diagram of an alternative embodiment of the speed sensor architecture of the present invention.

An alternative embodiment of the speed sensing architecture of the present invention is shown in the system block diagram of FIG. 4. Like the embodiment of FIG. 3, the system includes a radiating antenna 44 and a receive antenna for height sensing 46. A receive antenna 48 is also provided for speed sensing. Receive antenna 48 is disposed at a fixed angle θ relative to a mixer and filter 52. As those skilled in the art will recognize, angle φ 54 of receive antenna 48 is a function of vehicle height, i.e. φ=arctan (h/d). In both embodiments of FIGS. 3 and 4, a demodulator 56 is provided in electrical communication with the receive antenna 46. The demodulator 56 is in turn provided in electrical communication with a phase detector 58. Both embodiments also include a UHF source 60 which is provided in electrical communication with a modulator 62 and the phase detector 58. Also, in both embodiments, modulator 62 is provided in electrical communication with radiating antenna 44.

Still further, in both embodiments, a millimeter wave source 64 is provided in electrical communication with a mixer and filter 52 and the modulator 62. The embodiment of FIG. 4, however, deviates from that of FIG. 3 in that the millimeter wave source 64 in FIG. 4 is further provided in electrical communication with yet an additional mixer and filter 66 for measuring Doppler effects due to vertical chassis motion. This mixer and filter 66 is provided as an additional input to microcomputer 68 and is further provided in electrical communication with the modulator 56. In contrast, in the embodiment of FIG. 3, only two imprints were provided to microcomputer 68, namely, the vehicle height/road profile from phase detector 58 and additional information from the mixer and filter 52.

In operation, the method described herein for determining absolute vehicle speed on a continuous real-time basis in cooperation with an on-board vehicle microcomputer, includes the initial steps of providing an active aperture, a passive height sensor aperture, and a passive speed sensor aperture, all of which are affixed to the vehicle chassis. As referenced above, the active aperture and passive height aperture are oriented substantially vertical to the ground or road surface 42 while the passive speed sensor aperture is oriented at a selected angle theta relative to the same road surface. An RF signal is radiated from the active aperture having a selected frequency $F_0$ toward road surface 42. The Doppler Shift of the RF signal which is reflected back to the passive speed sensing aperture at some height dependent angle phi, as caused by vehicle motion in the forward direction is determined in accordance with the formula:

$$F^1 = F_0 \left[ 1 + \frac{2(\text{Vehicle Velocity})\cos(\phi)}{C(\text{Where } C = \text{Speed of Light})} \right]$$

and a first electrical signal corresponding thereto is generated on a continuous real-time basis for receipt by the on-board microcomputer. At the same time, the error introduced by vertical chassis velocity and/or road surface obstacles can be determined. To do so requires accurate real-time knowledge of vertical velocity. Vertical velocity may be derived from the rate of change of vehicle height as continuously measured by the height sensor, or alternatively may be determined by measuring the doppler shift of the carrier frequency at the passive height sensor antenna. A continuous signal corresponding thereto is thus generated on a continuous real-time basis for use by the microcomputer.

It is to be understood that the embodiments of this invention as shown and described are preferred examples and that the invention is not to be limited to the exact arrangement or sequence of parts or steps shown in the accompanying drawings or described in the specification. Various changes in the details of the construction and shape of the elements of the preferred embodiments may be made without departing from the spirit of the invention. The scope of the novel concepts of the invention are defined in the following claims.

We claim:

1. For use in a vehicle moving over a road surface, a millimeter wave radar system for determining the distance from the chassis of the vehicle to the road surface, the system comprising:

a primary oscillator for generating a first millimeter wave signal having a first carrier frequency;

a secondary oscillator for generating a second signal having a second frequency;

an amplitude modulator in electrical communication with said primary and secondary oscillators for mixing said first and second signals to generate a modulated RF signal;

a first directive aperture affixed to said chassis and in electrical communication with said amplitude modulator for radiating said modulated RF signal toward said road surface;

a second directive aperture affixed to said chassis for receiving said modulated RF signal as reflected from said road surface;

a demodulator in electrical communication with said second aperture for demodulating said reflected modulated RF signal to generate a demodulated RF signal having said second frequency; and a phase detector in electrical communication with said demodulator and said secondary oscillator for comparing the phases of said second signal and said demodulated RF signal to determine the phase offset between said second signal and said demodulated RF signal, wherein the distance from the chassis of the vehicle to the road surface may be determined on a continuous real-time basis by reference to said determined phase offset.

2. A system as in claim 1, wherein said phase detector generates an electrical output signal corresponding to the phase offset.

3. A system as in claim 2, wherein said electrical signal comprises sine and cosine analog voltage outputs.

4. A system as in claim 3, further comprising:

an analog to digital converter in electrical communication with said phase detector; and a microcomputer in electrical communication with said analog to digital converter for determining the arc tangent of the ratio of said sine and cosine phase detector outputs.

5. A system as in claim 4, wherein said microcomputer is further adapted to determine the sum of the squares of said sine and cosine phase detector outputs as a measure of signal power.

6. A system as in claim 1, further comprising an Automatic Gain Controller (AGC) in electrical communication with said primary oscillator for adjusting the power of said first signal on a continuous real-time basis to ensure the minimum amount of power is radiated and reduce the possibility of vehicle-to-vehicle interference.

7. A system as in claim 1, wherein said demodulator comprises a biased diode square-law detector.

8. A system as in claim 1, wherein said primary oscillator and said amplitude modulator are disposed in a single GaAs Monolithic Millimeter Wave Integrated Circuit (MMIC).

9. A system as in claim 1, wherein said demodulator is disposed in a GaAs Monolithic Millimeter Wave Integrated Circuit (MMIC).

10. For use in a vehicle moving over a road surface, a method of determining the distance from the chassis of the vehicle to the road surface, the method comprising:

generating a first millimeter wave signal having a first carrier frequency;

generating a second signal having a second frequency;

mixing said first and second signals to generate a modulated RF signal;

radiating said modulated RF signal from said chassis toward said road surface;

receiving said modulated RF signal at the chassis as reflected from said road surface;

demodulating said reflected modulated RF signal to generate a demodulated RF signal having said second frequency;

comparing the phases of said second signal and said demodulated RF signal to determine the phase offset between said second signal and said demodulated RF signal; and determining the distance from the chassis of the vehicle to the road surface as a function of the phase offset.

11. The method of claim 10, further including adjusting the power of said first signal on a continuous real-time basis to ensure that the minimum amount of power is radiated.

12. The method of claim 10, wherein said second frequency has a wavelength proportional to the length of suspension travel of the chassis over the road surface.

13. The method of claim 10, wherein said modulated RF signal is radiated substantially vertically from said chassis to said road surface.

14. The method of claim 10 further comprising generating an electrical output signal corresponding to the phase offset.

15. For use in a vehicle moving over a road surface, a method of determining vehicle speed on a continuous real-time basis, the method comprising:

radiating an RF signal having a frequency $F_0$ towards said road surface from an active aperture affixed to said chassis and oriented substantially perpendicular to said road surface;

receiving the RF signal as reflected from said road surface with a passive aperture affixed to said chassis and oriented at an angle phi relative to said road surface;

determining the Doppler Shifted frequency ($F^1$) of said reflected RF signal as caused by vehicle movement over the road surface;

determining the distance from the chassis of the vehicle to the road surface as the vehicle moves over the road surface;

determining the error in the Doppler Shifted frequency ($F^1$) caused by the change in the distance from the chassis to the road surface as the vehicle moves over the road surface;

correcting the Doppler Shifted frequency ($F^1$) as a function of the error to generate a true Doppler Shifted frequency ($F_2$); and determining the vehicle speed in accordance with the formula:

$$\text{Vehicle Speed} = \frac{(F^2 - F_0)C}{2F_0 \cos(\phi)}$$

where C = speed of light = 3E8 m/s.

16. The method of claim 15, wherein determining the distance from the chassis to the road surface as the vehicle moves over the road surface comprises:

generating a first millimeter wave signal having a first carrier frequency;

generating a second signal having a second frequency;

mixing said first and second signals to generate a modulated RF signal;

radiating said modulated RF signal from said chassis toward said road surface;

receiving said modulated RF signal as reflected from said road surface;

demodulating said reflected modulated RF signal to generate a demodulated RF signal having said second frequency;

comparing the phases of said second signal and said demodulated RF signal to determine the phase offset between said second signal and said demodulated RF signal; and determining the distance from the chassis of the vehicle to the road surface as a function of the phase offset.

\* \* \* \* \*